United States Patent [19]

Voigt

[11] Patent Number: 5,721,017

[45] Date of Patent: Feb. 24, 1998

[54] METHOD FOR MANUFACTURING AQUEOUS COATING AGENTS BY REUSING LACQUER SLURRY AND THE COATING AGENTS OBTAINED IN THIS WAY

[75] Inventor: Günther Voigt, Metepec, Mexico

[73] Assignee: Herberts GmbH, Wuppertal, Germany

[21] Appl. No.: 636,717

[22] Filed: Apr. 23, 1996

Related U.S. Application Data

[63] Continuation of Ser. No. 307,522, Sep. 16, 1994, abandoned.

[30] Foreign Application Priority Data

Sep. 17, 1993 [DE] Germany ............... 43 31 674.3

[51] Int. Cl.⁶ ................... B05D 3/02; B05D 1/38
[52] U.S. Cl. ............ 427/388.4; 427/345; 427/409; 427/421
[58] Field of Search ............ 210/712; 427/421, 427/345, 409, 379, 388.4

[56] References Cited

U.S. PATENT DOCUMENTS

| | | | |
|---|---|---|---|
| 4,197,355 | 4/1980 | Shepherd | 427/393.5 |
| 4,312,795 | 1/1982 | Taguchi et al. | 523/220 |
| 4,315,053 | 2/1982 | Poth et al. | 427/409 |
| 4,564,464 | 1/1986 | Harpel et al. | 427/421 |
| 4,567,213 | 1/1986 | Bhatia et al. | 524/389 |
| 4,607,592 | 8/1986 | Richter | 427/421 |
| 4,944,964 | 7/1990 | Schmidt et al. | 427/407.2 |
| 5,282,970 | 2/1994 | Wepf | 210/652 |
| 5,292,547 | 3/1994 | Schlumpf et al. | 427/421 |
| 5,352,250 | 10/1994 | Geke et al. | 210/710 |
| 5,395,659 | 3/1995 | Gräf et al. | 427/409 |
| 5,425,970 | 6/1995 | Lahrmann et al. | 427/407.1 |
| 5,453,301 | 9/1995 | Saatweber et al. | 427/421 |
| 5,520,955 | 5/1996 | Nawotka | 427/407.1 |

*Primary Examiner*—Diana Dudash
*Attorney, Agent, or Firm*—Schweitzer Cornman Gross & Bondell LLP

[57] ABSTRACT

The re-use of lacquer slurry in the manufacture of aqueous coating agents is described, A) one part by weight of freshly obtained lacquer slurry with a water content of 10 to 50% by weight being incorporated under shearing action into B) 0.15 to 0.6 parts by weight of a mixture of B1) one or more organic solvents with a water solubility exceeding 500 g per liter of water at 20° C., B2) one or more organic solvents with a water solubility below 500 g per liter of water at 20° C., B3) one or more amines and/or aminoalcohols and B4) optionally, one or more wetting agents common to lacquers, a homogenization by the shearing action taking place either in the entire component B) or initially in the component B1) with subsequent addition of the components B2), B3) and optionally B4), whereupon 0.4 to 1.5 parts by weight of the homogenized mixture of the components A) and B) are incorporated into C) one part by weight of an aqueous lacquer concentrate based on an aqueous binder dispersion with a minimum film-forming temperature below 10° C. and a solids content exceeding 40% by weight.

The coatings obtained in this way can be used in particular in the motor vehicle sector, as underseal for example.

10 Claims, No Drawings

METHOD FOR MANUFACTURING AQUEOUS COATING AGENTS BY REUSING LACQUER SLURRY AND THE COATING AGENTS OBTAINED IN THIS WAY

This is a continuing application of U.S. Ser. No. 08/307,522 filed Sep. 16, 1994; now abandoned.

BACKGROUND OF THE INVENTION

The invention relates to a method for manufacturing aqueous coating agents which contain additions of lacquer slurry, thereby permitting the re-use of residues from lacquering booths. The invention also relates to the coating agents obtained in this way.

In many fields of industry lacquers are applied by the spray method. These are lacquers which contain solvents or water-based lacquers. A proportion of the sprayed coating agent does not reach the substrate and is collected in special spray booths. Spray booths which have water-irrigated walls are generally known. Overspray is collected in the water circulating in the booth and occurs in the form of aqueous lacquer slurries. In the field of large-scale motor vehicle lacquering, for example, these lacquer slurries are formed from primer surfacer, base lacquer, top-coat lacquer and clear lacquer overspray. These aqueous lacquer slurries are obtained by coagulation of the spray lacquer overspray deposited in the water circulating in the booth. The circulating water can then be conveyed in the cycle. Chemical and physical methods of coagulation are available. Examples are electrocoagulation and precipitation by adding chemicals such as acids, salts, polyelectrolytes, or solids such as phyllosilicates.

The lacquer slurries obtained in this way are then separated in decanters, the water is removed in a crude fashion and they then have to be dumped as special waste. In view of the fact that space for dumping is in increasingly short supply, intensive efforts have been made to find alternative methods of disposal or re-use for such lacquer slurries. U.S. Pat. No. 4,312,795 describes aqueous coating agents containing an aqueous binder dissolved in water, an amine and a hydrophilic solvent. Wastes of powder coating agents can be added.

DE-A-39 24 312 and WO 90/08178 describe the mixing of lacquer slurry with coaldust and alkaline materials for the purpose of solidification and subsequent incineration.

EP-A-502 232 describes a biological degradation method for lacquer slurries. The method is complicated and remaining residues also have to be dumped.

DE-A-39 31 204 describes a method for incorporating well dehydrated lacquer slurries into a melt of thermoplastic plastics and re-processing into mouldings.

DE-A-40 12 189 describes a method of disposing of lacquer slurries by processing into slabs for the building industry under the effects of pressure and high temperature. As with the previous methods, the water content of the lacquer slurry may not be too high, in the starting material for the manufacture of slabs it should be between 1 and 30% by weight.

EP-B-407 770 describes the disposal of aqueous lacquer slurries by applying the slurries containing more than 30% residual moisture to suitable strip-like carrier materials, followed by a drying step.

All these methods are energy-intensive and/or operate only with sufficiently dehydrated lacquer slurry.

EP-A-212 214 describes a method for re-processing lacquer slurries occurring in still cross-linkable form by emulsifying with the addition of surface-active agents. The preparations of the still cross-linkable lacquer slurries obtained in this way are then used to make sound-proofing and heat-insulating panels or brushable, pasty dispersions which produce foamed layers with an insulating action when cured under the effect of heat.

DE-A-38 21 760 and EP-A-481 174 describe methods for recovering the lacquer constituents, such as pigments, binders, solvents, from lacquer slurries by a combination of complicated chemical and physical processes.

SUMMARY OF THE INVENTION

The object of the invention is to propose a method which enables aqueous lacquer slurries to be re-used in a simple manner and to produce high-grade products. The method should be capable of being implemented with crudely dehydrated lacquer slurries, without the need for energy-intensive drying steps.

DETAILED DESCRIPTION OF THE INVENTION

It has been shown that this object can be achieved by the provision of aqueous coating agents, a constituent of which is re-processed lacquer slurry.

The invention therefore relates to a method for manufacturing aqueous coating agents by re-using lacquer slurry, which is characterized in that
A) one part by weight of freshly obtained lacquer slurry with a water content of 10 to 50% by weight is incorporated under shearing action into
B) 0.15 to 0.6 parts by weight of a mixture of
   B1) one or more organic solvents with a water solubility exceeding 500 g per litre of water at 20° C.,
   B2) one or more organic solvents with a water solubility below 500 g per litre of water at 20° C.,
   B3) one or more amines and/or aminoalcohols and
   B4) optionally, one or more wetting agents common to lacquers,
a homogenization by the shearing action taking place either in the entire component B) or initially in the component B1) with subsequent addition of the components B2), B3) and optionally B4), whereupon 0.4 to 1.5 parts by weight of the homogenized mixture of the components A) and B) are incorporated into
C) one part by weight of an aqueous lacquer concentrate based on an aqueous binder dispersion with a minimum film-forming temperature below 10° C. and a solids content exceeding 40% by weight.

The invention further relates to the aqueous coating agents obtained according to the method according to the invention.

The freshly obtained, partially dehydrated lacquer slurries A) are overspray coagulates of aqueous or solvent-based coating agents separated in ordinary decanters. The coagulates of aqueous coating agents are preferred. Overspray coagulates based on single-component or multi-component coating agents can be used for the method according to the invention. In the case of overspray coagulates of multi-component coating agents, these should not yet be cross-linked. The coagulates of single-component coating agents are preferred. These can be coating agents based on physically drying or chemically cross-linking binders. Common binder systems based on organic film-forming resins, such as acrylate resins, polyester resins or polyurethane resins, are suitable. They should not contain binders containing fluorine and those based on polysiloxane. The coating agents can be pigmented or unpigmented. Examples of coating agents whose overspray coagulate can be re-used with the aid of the method according to the invention are decorative base lacquers, plain-coloured base lacquers, top-coat lacquers, primer surfacers and clear lacquers. Preferred examples are base lacquers, top-coat lacquers and primer surfacers, particularly Water-based lacquers, aqueous top-coat lacquers and water-based primer surfacers.

The method according to the invention also permits the processing of such aqueous lacquer slurries to aqueous coating agents which contain mixtures of overspray coagulates of different coating agents.

In order to obtain as uniform as possible a lacquer slurry concentrate it is preferred to mix different individual lacquer slurries. This can take place either at the stage of the lacquer slurry, or a mixing of the mixtures produced from lacquer slurry A) and additives B) is undertaken. Care should be taken to ensure that only lacquer slurries based on similarly charged and/or charge-free binders are mixed together. Lacquer slurries containing anionic or non-ionic binders are preferably used.

By the mixing of different lacquer slurry types, differences in the pigment content and/or the binder composition can be balanced out and the lacquer slurry concentrate has a more uniform composition.

The lacquer slurries A) obtained in the decanter have solids contents of 50–90% by weight, preferably 60–85% by weight. Their water content is between 10 and 50% by weight, preferably between 15 and 40% by weight. A further reduction of the water content, e.g. by means of additional process measures, is not necessary but is possible.

The method according to the invention is implemented with freshly obtained lacquer slurry. The lacquer slurry should not, for example, be more than 24 hours old before it is incorporated into the additives B), i.e. the organic solvents, amines and optionally wetting agents.

The incorporation of A) into B) can take place directly at the user's premises, e.g. by direct incorporation of the lacquer slurry obtained in the decanter into a container filled with B), or the lacquer slurry is transported to a processor. The resulting mixture is stable under storage and can also be re-processed at a later date.

It is essential to the invention that A) is incorporated into the additive mixture B) and not vice-versa. This should take place under constant shearing action. The composition of B) can be varied according to the composition of the lacquer slurry concentrate A), e.g. according to its water content. If A) has a water content exceeding 30% by weight, it is preferred to incorporate A) into the component B1) only under shearing action, and to mix in the further components of B), viz. B2), B3) and B4), when homogenization is complete. If the water content of A) is less than 30% by weight, it is preferred to incorporate A) into the ready-prepared additive mixture of B1), B2), B3) and B4).

The additives B) should contain at least one organic solvent B1) having a water solubility exceeding 500 g per litre of water at 20° C., at least one organic solvent B2) having a water solubility of less than 500 g per litre of water at 20° C., at least one amine and/or one aminoalcohol B3) and optionally a wetting agent B4) that is common for lacquers.

Of the organic solvents B1), those are preferred which are unrestrictedly water-soluble at 20° C. Preferred organic solvents B2) are those which have a water solubility of 1.0 to 450 g per litre of water at 20° C.

Examples of organic solvents B1) are N-methylpyrrolidone, dimethylformamide; alcohols, e.g. alkanols, such as methanol and ethanol; glycols, such as ethylene glycol, propylene glycol, diethylene glycol, dipropylene glycol, triethylene glycol, tripropylene glycol; glycol ethers such as methylglycol, ethylglycol, isopropylglycol, butylglycol, methydiglycol, ethyldiglycol, butyldiglycol, ethyltriglycol, butyltriglycol, methoxypropanol, ethoxypropanol, propoxypropanol, propylene glycol dimethylether, dipropylene glycol dimethylether, diethylene glycol dimethylether, dipropylene glycol monomethyl ether, methoxybutanol; but also methylglycol acetate. Particularly preferred solvents B1) are N-methylpyrrolidone and unrestrictedly water-soluble glycol ethers.

Examples of organic solvents B2) are alcohols, e.g. alkanols, such as butanol, sec.-butanol; glycol ethers such as hexylglycol, butoxypropanol, dipropylene glycol butylether, tripropylene glycol butylether; glycol ether esters such as ethylglycol acetate, butylglycol acetate, butyldiglycol acetate, methoxypropyl acetate, ethoxypropyl acetate; glycol esters, such as propylene glycol diacetate. Particularly preferred solvents B2) are glycol ether esters with a water solubility between 1.0 and 450g per litre of water at 20° C.

B) preferably contains 45 to 70% by weight of one or more solvents B1), and 30 to 50% by weight of one or more solvents B2), 1 to 5% by weight of one or more amines and/or aminoalcohols B3) and 0 to 3% by weight, preferably 0.5 to 3% by weight of one or more common commercial wetting agents B4).

A preferred solvent mixture (B1+B2) is the combination of butylglycol acetate and butyl glycol, particularly in the mix ratio between 0.5:1 and 1.1:1, related to the weight.

As additives B3) the amines common to lacquers, such as triethylamine, N-methylmorpholine, are suitable individually or mixed. The aminoalcohols common to lacquers, such as 2-amino-2-methyl-1-propanol, dimethylisopropanolamine, dimethylethanolamine, are, however, preferably used. The amines are used in proportions of 1–5% by weight, preferably under 4% by weight related to the mixture of B1), B2), B3) and B4).

The wetting or dispersing agents common in the lacquer industry are used as wetting agents B4). They are used in proportions of 0–3% by weight, related to the mixture of B1), B2), B3) and B4). An example of a preferred wetting agent is tetramethyldecindiol.

The additives B), i.e. the organic solvents, amines and/or aminoalcohols and optionally wetting agents are intensively mixed under shearing action, e.g. agitation, with the freshly obtained lacquer slurry A) in a weight ratio of 0.15:1 to 0.6:1, preferably 0.2:1 to 0.5:1, A) being incorporated into B).

A homogeneous mixture which is stable under storage is formed. This can be re-processed immediately or it can be processed at a later date.

The aqueous lacquer concentrate C) is based on an aqueous binder dispersion with a minimum film forming temperature below 10° C., preferably below 5° C. These are non-cross-linking, physically drying binders. Polyurethanes, (meth)acrylic copolymers, styrene-acrylic copolymers and styrene-butadiene copolymers can be used as the binder base, for example.

The aqueous lacquer concentrate C) preferably contains an aqueous styrene-butadiene copolymer latex as the aqueous binder dispersion. Such latices are available commercially, examples being the commercial products Lipaton SB 4520 and Lipaton SB 5521 manufactured by H üls.

The aqueous lacquer concentrate C) is pigmented with pigments and/or fillers common to lacquers, such as carbon black, titanium dioxide, barium sulphate, calcium carbonate, silicon dioxide, talc, kaolin. Black or dark grey aqueous lacquer concentrates containing carbon black are preferably used. Pigmenting takes place by dispersing the pigments and fillers in the aqueous binder dispersion. Pigmenting using a pigment paste and hence a specific paste resin is possible but not preferred.

The aqueous lacquer concentrate C) has a solids content in excess of 40% by weight preferably with a pigment/binder ratio of 0.1:1 to 3.0:1 related to the weight.

Furthermore, the aqueous lacquer concentrates C) can contain organic solvents in small proportions of up to 10% by weight, preferably below 7% by weight. Preferred organic solvents contained in the aqueous lacquer concentrate C) are those which were described above as components B1) or B2).

The aqueous lacquer concentrates can also contain common additives for aqueous lacquer systems such as antifoaming agents, wetting agents, plasticizers, flow agents, thickeners.

The homogeneous mixture of A) and B) is incorporated into the aqueous lacquer concentrate C) on the basis of an aqueous binder dispersion with a minimum film-forming temperature below 10° C. under shearing action, by which intensive mixing, e.g. agitation or treatment in a static mixer, is meant, for example. The mix ratio comprises 0.4–1.5 parts of the mixture produced from A) and B) to 1 part of lacquer concentrate C), preferably 0.5–1.1 parts to 1 part.

In order to obtain as uniform a coating agent as possible it is possible to determine the solids and/or pigment content of the mixture produced from A) and B). If a high pigment content is present in it, the pigment/binder ratio of C) is in the lower range, for example. If the mixture of A) and B) has only a low pigment content, the pigment/binder ratio of C) is in the upper range, for example.

The aqueous coating agents obtained according to the method according to the invention preferably have solids contents of 45to 70% by weight for a pigment/binder ratio preferably set between 0.4:1 and 1.5:1. The viscosity of the coating agent produced by mixing A), B) and C) can be adjusted by adding water. It is also possible for the pH to be set. Generally speaking the pH should be between 8 and 9.5, preferably under 9.

No additional cross-linking agents are added to the coating agent. It is an essentially physically drying system. Cross-linking agents which were introduced optionally via the lacquer slurry concentrate are present in small quantities and on stove-enamelling, optionally lead to a slight cross-linking. Only the molar mass of the binders present in the coating agent according to the invention is increased by this.

An aqueous coating agent which is stable under storage, which is particularly suitable as an underseal:material, is obtained by intensive mixing of the constituents A), B) and C) according to the method according to the invention.

The aqueous coating agent obtained according to the method according to the invention is applied by brushing or spraying, preferably airless spraying—optionally in several spray operations—in a dry layer thickness of 50–3000 μm. Application is to metallic substrates, e.g. electrophoretically primed metal sheets. Application takes place in particular in the area of the underbody and the sill of electrophoretically primed bodies such as are encountered in large-scale motor car and commercial vehicle lacquering.

Following optionally prior ventilation at 20° to 30° C. the underseal layers obtained in this way are stove-enamelled or dried. This takes place at temperatures of 60°–180° C., preferably in a joint step together with the stove-enamelling of a primer surfacer coating. Flexible coating layers which are resistant to impact from stones are obtained.

The method according to the invention enables crudely dehydrated lacquer slurries to be processed in a simple manner into valuable aqueous underseal materials. In particular it is not necessary to dehydrate the lacquer slurry in an energy-intensive manner.

The implementation of the method according to the invention is not restricted to the processing of aqueous lacquer slurries of only one type, i.e. the aqueous lacquer slurry can also contain mixtures of overspray coagulates of different coating agents.

In the examples which follow parts and percentages relate to weight unless otherwise stated.

MANUFACTURE OF AQUEOUS LACQUER CONCENTRATES C

Example 1

40 parts of a common commercial aqueous dispersion of a styrene-butadiene copolymer with a solids content of 50% by weight and a minimum film-forming temperature of 0° C. are mixed with the aid of the dissolver with 2 parts of a 30% butanolic solution of a common commercial wetting agent, 1.5 parts of a 20% aqueous solution of sodium polyphosphate and 0.5 parts of dimethyl ethanolamine. 2.5 parts of carbon black and 52.5 parts of calcium carbonate are then stirred in. After the addition of 1 part butylglycol acetate, dispersion takes place for 20 minutes with the aid of the dissolver.

Example 2

Similarly to Example 1, 80 parts of the aqueous dispersion of the styrene-butadiene copolymer from Example 1, 4 parts of the solution of the wetting agent from Example 1, 3 parts of the aqueous solution of sodium polyphosphate, 1 part dimethyl ethanolamine, 5 parts carbon black, 2 parts butylglycol acetate and additionally 5 parts of a 20% aqueous polyacrylic acid-based thickener are processed.

MANUFACTURE OF AQUEOUS UNDERSEAL MATERIALS

Example 3

69 parts of a waterborne basecoat coagulate, obtained from the decanter of an industrial lacquering plant as a partially dehydrated overspray mixture of different coloured plain and decorative water-based base lacquers, with 75% solids and a pigment/binder ratio of 0.2:1 by weight are slowly added to a mixture of 15 parts butylglycol, 15 parts butylglycol acetate and 1 part dimethyl ethanolamine under constant agitation. When the addition is completed, agitation takes place for 15 minutes until complete homogenization has been achieved.

35 parts of the homogeneous mixture obtained in this way are allowed to flow into 65 parts of the lacquer concentrate of Example 1 under agitation.

Example 4

74 parts of a waterborne primer surfacer coagulate, obtained from the decanter of an industrial lacquering plant as a partially dehydrated overspray mixture of different-coloured water-based primer surfacers, with 78% solids and a pigment/binder ratio of 1.5:1, are slowly added to a mixture of 12.5 parts butylglycol, 12.5 parts butylglycol acetate and 1 part dimethyl ethanolamine under constant agitation. Agitation takes place for 15 minutes until complete homogenization has been achieved.

40 parts of the homogeneous mixture obtained in this way are allowed to flow into 60 parts of the lacquer concentrate of Example 2 under agitation.

Example 5

Example 4 is repeated but with the difference that 12.5 parts N-methylpyrrolidone are used instead of the 12.5 parts butylglycol.

Cataphoretically primed steel sheets are coated in a dry layer thickness of 100 μm with the aqueous underseal materials from Examples 3, 4 and 5. After five minutes' ventilation at room temperature, stove-enamelling takes place for 20 minutes at 180° C. Satisfactorily adhering, flexible coatings with good resistance to impact from stones and a good level of corrosion protection are obtained.

I claim:

1. A method for the manufacture of aqueous layers to metallic substrates which comprises applying the following aqueous coating composition to said metallic substrates, said aqueous coating agent comprising
   A) one part by weight of freshly obtained, dehydrated lacquer slurry derived as an overspray coagulate of an aqueous or solvent-based coating agent obtained by decantation separation said slurry being less than 24 hours old and having a water content of 10 to 50% by weight incorporated under shearing action into
   B) 0.15 to 0.6 parts by weight of a mixture of
      B1) one or more organic solvents with a water solubility exceeding 500 g per litre of water at 20 ° C.,
      B2) one or more organic solvents with a water solubility below 500 g per litre of water at 20° C.,
      B3) one or more amines and/or aminoalcohols and
      B4) optionally, one or more wetting agents common to lacquers,
   a homogenization by the shearing action taking place either in the entire component B) or initially in the component B1) with subsequent addition of the components B2), B3) and optionally B4), whereupon 0.4 to 1.5 parts by weight of the homogenized mixture of the components A) and B) are incorporated into
   C) one part by weight of an aqueous lacquer concentrate based on an aqueous binder dispersion with a minimum film-forming temperature below 10° C. and a solids content exceeding 40% by weight.

2. The method of claim 1 wherein said aqueous coating composition is applied in several spray operations to ultimately result in a dry layer thickness of 50–3,000 mm.

3. The method of claim 1 wherein said metallic substrate is an electro-phoretically primed metal sheet.

4. The method of claim 1 wherein after coating step the underseal layers are subjected to temperatures of 60–180° C.

5. The method of claim 4 wherein said treatment at temperatures of 60°–180° C. is effected by stove-enamelling or drying.

6. The method of claim 4 wherein said coated underseal layers are first ventilated at 20°–30° C. before said heat treatment.

7. the method of claim 1 wherein component B) contains 45 to 70% by weight of the solvent component B1), 30 to 50% by weight of the solvent component B2), 1 to 5% by weight of the amine and/or aminoalcohol component B3) and 0 to 3% by weight of the wetting agent component B4).

8. The method of claim 1 wherein N-methylpyrrolidone, dimethylformamide, alcohols and/or glycol ethers are used as solvent component B1).

9. The method of claim 1 wherein alcohols, glycol ethers, glycol ether esters and/or glycol esters are used as solvent component B2).

10. The method of claim 1 wherein lacquer concentrate C) is based on polyurethanes, (meth)acrylic copolymers, styrene-acrylic copolymers and/or styrene-butadiene copolymers as binders.

* * * * *